(12) United States Patent
Weathers et al.

(10) Patent No.: US 12,415,238 B2
(45) Date of Patent: Sep. 16, 2025

(54) FRICTION WELD PLUG

(71) Applicant: The Boeing Company, Chicago, IL (US)

(72) Inventors: Jeffrey W. Weathers, Chicago, IL (US); James B. Weathers, Chicago, IL (US)

(73) Assignee: The Boeing Company, Chicago, IL (US)

( * ) Notice: Subject to any disclaimer, the term of this patent is extended or adjusted under 35 U.S.C. 154(b) by 620 days.

(21) Appl. No.: 17/823,285

(22) Filed: Aug. 30, 2022

(65) Prior Publication Data

US 2024/0066637 A1 Feb. 29, 2024

(51) Int. Cl.
*B23K 35/02* (2006.01)
*B23K 20/12* (2006.01)

(52) U.S. Cl.
CPC ...... *B23K 35/0288* (2013.01); *B23K 20/1295* (2013.01)

(58) Field of Classification Search
CPC .............. B23K 20/1295; B23K 35/0288; B23K 20/12; B23K 20/1245
USPC ........................................ 219/98; 228/112.1
See application file for complete search history.

(56) References Cited

U.S. PATENT DOCUMENTS

| | | | |
|---|---|---|---|
| 11,577,338 B2* | 2/2023 | Oezkan | B23K 20/1295 |
| 2015/0222027 A1* | 8/2015 | Dupuis | H01R 4/029 |
| | | | 439/805 |

* cited by examiner

*Primary Examiner* — Chris Q Liu
*Assistant Examiner* — James F Sims, III
(74) *Attorney, Agent, or Firm* — Yee & Associates, P.C.

(57) ABSTRACT

A friction weld plug includes a gasket and a stud. The stud includes a nose configured to be inserted into a first hole formed within a wall. The nose includes a cavity having female threads. The stud also includes a shoulder extending radially from the nose and including a groove configured to contain the gasket. The friction weld plug also includes a spacer including a second hole and a fastener including male threads. The fastener is configured to be inserted through the second hole, into the first hole, and into the cavity such that the male threads and the female threads form an attachment that presses the spacer against a first side of the wall and presses the gasket against a second side of the wall that is opposite the first side, thereby forming a seal between the gasket and the second side of the wall.

20 Claims, 7 Drawing Sheets

```
┌─────────────────────────────────────────────────────────┐
│ BONDING, VIA A FRICTION STIR WELDING PROCESS, A FIRST   │
│ PANEL TO A SECOND PANEL, THEREBY FORMING A WALL AND     │
│         PRODUCING A HOLE IN THE WALL                    │
└─────────────────────────────────────────────────────────┘
    202 ↓
┌─────────────────────────────────────────────────────────┐
│ INSERTING, FROM A FIRST SIDE OF THE WALL, A FASTENER OF │
│ THE FRICTION WELD PLUG THROUGH A SPACER OF THE FRICTION │
│        WELD PLUG AND INTO THE HOLE IN THE WALL          │
└─────────────────────────────────────────────────────────┘
    204 ↓
┌─────────────────────────────────────────────────────────┐
│  INSERTING, FROM A SECOND SIDE OF THE WALL THAT IS      │
│ OPPOSITE THE FIRST SIDE, A NOSE OF A STUD OF THE FRICTION│
│              WELD PLUG INTO THE HOLE                    │
└─────────────────────────────────────────────────────────┘
    206 ↓
┌─────────────────────────────────────────────────────────┐
│ CREATING, VIA ROTATING MALE THREADS OF THE FASTENER     │
│ AGAINST FEMALE THREADS OF A CAVITY WITHIN THE NOSE, AN  │
│ ATTACHMENT THAT PRESSES THE SPACER AGAINST THE FIRST    │
│ SIDE OF THE WALL AND PRESSES A GASKET AGAINST THE       │
│ SECOND SIDE OF THE WALL, THEREBY FORMING A SEAL         │
│ BETWEEN THE GASKET CONTAINED IN A GROOVE IN A SHOULDER  │
│         OF THE STUD AND THE SECOND SIDE OF THE WALL     │
└─────────────────────────────────────────────────────────┘
    208                                              ↖ 200
```

FIG. 10

```
┌─────────────────────────────────────────────────────────┐
│       ENLARGING THE HOLE IN THE WALL VIA DRILLING       │
└─────────────────────────────────────────────────────────┘
    210                                              ↖ 250
```

FIG. 11

FRICTION WELD PLUG

FIELD

The present disclosure generally relates to a friction weld plug, and more specifically to a friction weld plug that includes a gasket, a stud, a spacer, and a fastener.

BACKGROUND

Using friction stir welding to weld two sections of material typically yields a hole on the weld line where the friction weld tool is removed from the material at the end of the weld line. The hole is generally filled with a plug which usually causes degraded material properties at the vicinity of the hole when compared to the rest of the weld line. Thus, the material is often designed such that the degraded material properties at the hole meets a manufacturing standard and the rest of the weld line greatly exceeds that standard, which can lead to some inefficiencies. As such, a need exists for a friction weld plug that provides better material properties for the weld, such as increased strength and ductility.

SUMMARY

One aspect of the disclosure is a friction weld plug comprising: a gasket; a stud comprising: a nose configured to be inserted into a first hole formed within a wall, wherein the nose comprises a cavity having female threads; and a shoulder extending radially from the nose and comprising a groove configured to contain the gasket; a spacer comprising a second hole; and a fastener comprising male threads, wherein the fastener is configured to be inserted through the second hole, into the first hole, and into the cavity such that the male threads and the female threads form an attachment that presses the spacer against a first side of the wall and presses the gasket against a second side of the wall that is opposite the first side, thereby forming a seal between the gasket and the second side of the wall.

Another aspect of the disclosure is a method for installing a friction weld plug, the method comprising: bonding, via a friction stir welding process, a first panel to a second panel, thereby forming a wall and producing a hole in the wall; inserting, from a first side of the wall, a fastener of the friction weld plug through a spacer of the friction weld plug and into the hole in the wall; inserting, from a second side of the wall that is opposite the first side, a nose of a stud of the friction weld plug into the hole; and creating, via rotating male threads of the fastener against female threads of a cavity within the nose, an attachment that presses the spacer against the first side of the wall and presses a gasket against the second side of the wall, thereby forming a seal between the gasket contained in a groove in a shoulder of the stud and the second side of the wall.

Another aspect of the disclosure is a friction weld plug comprising: a first spring seal; a second spring seal; a stud comprising: a nose configured to be inserted into a first hole formed within a wall, wherein the nose comprises a cavity having female threads; and a shoulder extending radially from the nose and comprising a first groove configured to contain the first spring seal and a second groove configured to contain the second spring seal; a spacer comprising a second hole; and a fastener comprising male threads, wherein the fastener is configured to be inserted through the second hole, into the first hole, and into the cavity such that the male threads and the female threads form an attachment that presses the spacer against a first side of the wall and presses the first spring seal and the second spring seal against a second side of the wall that is opposite the first side, thereby forming a first seal between the first spring seal and the second side of the wall and a second seal between the second spring seal and the second side of the wall.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 10 is a block diagram of a method, according to an example.

FIG. 11 is a block diagram of a method, according to an example.

DETAILED DESCRIPTION

As noted above, a need exists for a friction weld plug that provides better material properties for the weld. As such, an aspect of the disclosure is a friction weld plug that includes a gasket (e.g., a spring seal) and a stud. The stud includes a nose configured to be inserted into a first hole formed within a wall. The first hole can be created by a friction stir welding process upon removal of the bit from the material. For example, the wall can be part of a tank used for storing pressurized gas and can take the form of two metallic panels welded together by the friction stir welding process. The nose includes a cavity having female threads. The stud also includes a shoulder extending radially from the nose and including a groove configured to contain the gasket. The friction weld plug also includes a spacer including a second hole and a fastener that includes male threads. The fastener is configured to be inserted through the second hole, into the first hole, and into the cavity such that the male threads and the female threads form an attachment that presses the spacer against a first side (e.g., an exterior side) of the wall and presses the gasket against a second side (e.g., an interior side) of the wall that is opposite the first side, thereby forming a seal between the gasket and the second side of the wall.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Figure 1:
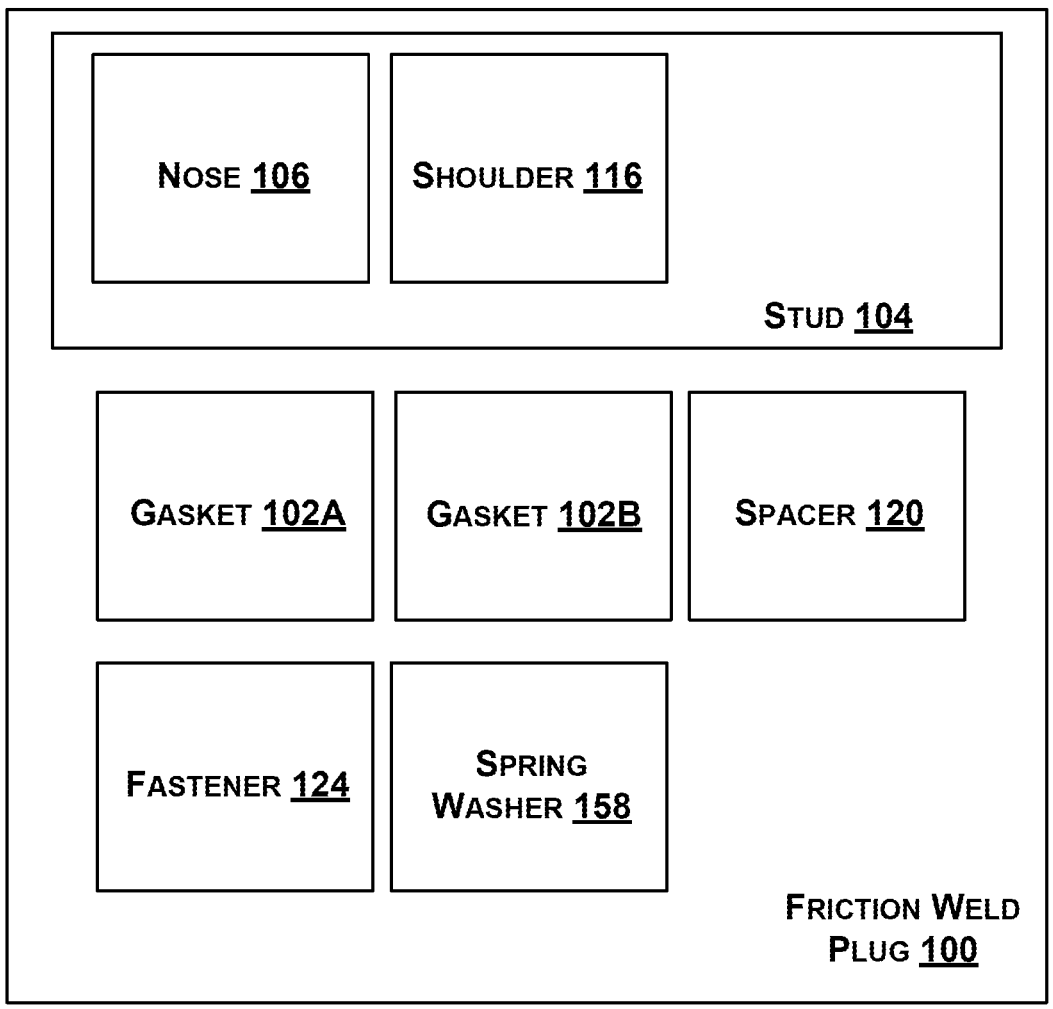
FIG. 1 is a block diagram of a friction weld plug, according to an example.

FIG. 1 is a block diagram of a friction weld plug 100. The friction weld plug 100 includes a gasket 102A, a gasket 102B, and a stud 104. The stud 104 includes a nose 106 and a shoulder 116. The friction weld plug 100 also includes a spacer 120, a fastener 124, and a spring washer 158.

Figure 2:
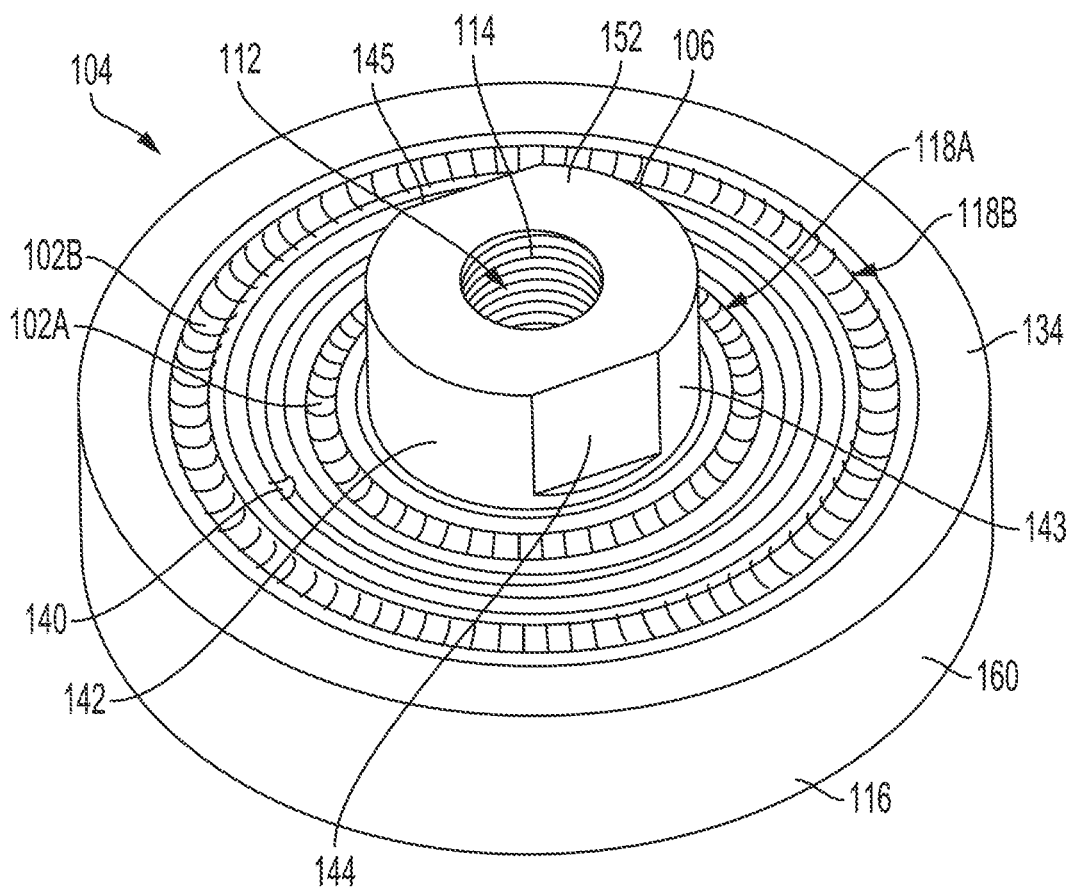
FIG. 2 is a perspective view of a stud, according to an example.

FIG. 2 is a perspective view of the stud 104. As shown, the stud 104 includes the nose 106 that further includes a cavity 112 having female threads 114. The cavity 112 is elongated in an axial direction and is substantially cylindrical. The nose 106 extends in an axial direction away from the shoulder 116 and includes a surface 142 and a surface 143 that face radially outward and are round. The nose 106 also includes a surface 144 and a surface 145 that that face radially outward and are substantially flat. The nose 106 also includes a surface 152 that that faces axially away from the shoulder 116 and that surrounds an opening to the cavity 112.

The stud 104 includes the shoulder 116 that extends radially from the nose 106 and includes a groove 118A configured to contain the gasket 102A and a groove 118B that is configured to contain the gasket 102B. The groove 118B surrounds the groove 118A. Both the groove 118A and the groove 118B have an annular shape, but other examples are possible. The shoulder 116 includes a surface 160 that faces radially outward and is round. The shoulder 116 also includes an outlet 140 within a surface 134 that is discussed in more detail below.

The stud 104 is typically a singular machined metal part. That is, the nose 106 and the shoulder 116 are generally integrated.

Figure 3:
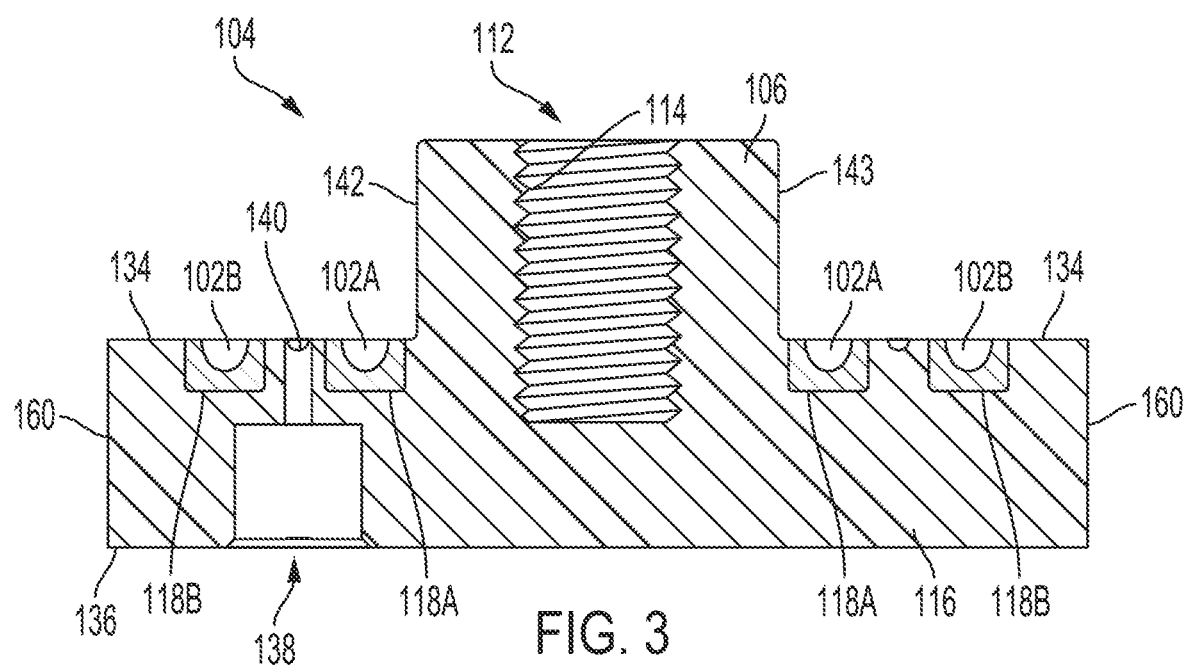
FIG. 3 is a cross sectional view of a stud, according to an example.

FIG. 3 is a cross sectional view of the stud 104. The shoulder 116 includes the surface 134 that includes the groove 118A and the groove 118B. The shoulder 116 also includes a surface 136 opposite the surface 134 and a port 138 that provides fluid communication between the surface 134 and the surface 136. The port 138 includes the outlet 140 between the groove 118A and the groove 118B and on the surface 136. The port 138 can be used to test a seal created by the friction weld plug 100. The gasket 102A and the gasket 102B can each take the form of a spring seal coated with a friction reducing material.

Figure 4:
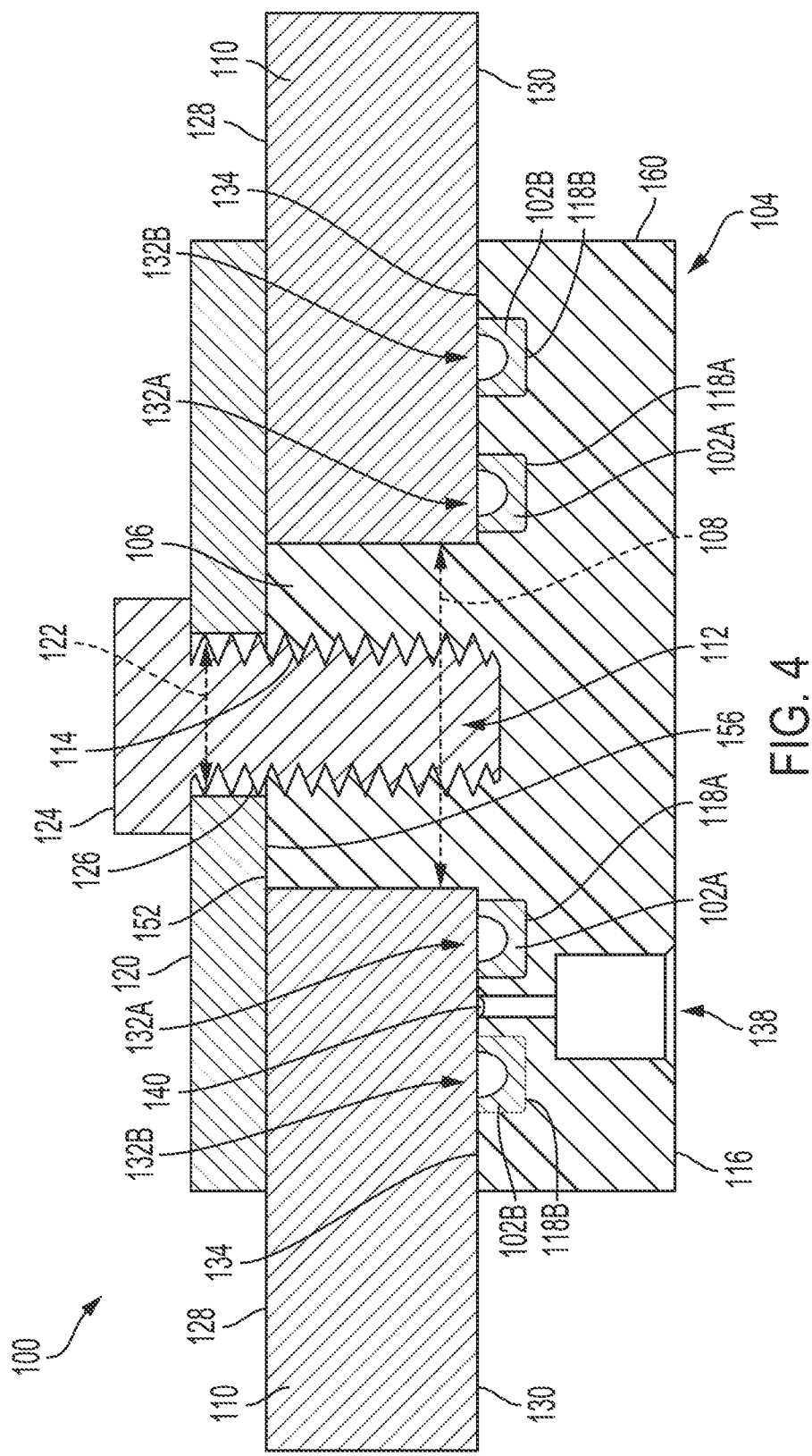
FIG. 4 is a cross sectional view of a wall and a friction weld plug, according to an example.

FIG. 4 is a cross sectional view of the friction weld plug 100 and a wall 110. As shown, the nose 106 is configured to be inserted into a hole 108 formed within the wall 110. The friction weld plug 100 also includes the spacer 120 that includes a hole 122 and a fastener 124 that includes male threads 126. The fastener 124 is configured to be inserted through the hole 122, into the hole 108, and into the cavity 112 such that the male threads 126 and the female threads 114 form an attachment that presses the spacer 120 against a side 128 of the wall 110 and presses the gasket 102A and the gasket 102B against a side 130 of the wall 110 that is opposite the side 128, thereby forming a seal 132A between the gasket 102A and the side 130 of the wall 110 and forming a seal 132B between the gasket 102B and the side 130 of the wall 110.

As shown, the nose 106 is inserted into the hole 108 such that the surface 134 of the shoulder 116 contacts the side 130 of the wall 110.

The wall 110 can be part of a metallic tank used for storing pressurized gas and can take the form of two or more metallic panels welded together by a friction stir welding process. More specifically, the hole 108 can be created by the removal of the welding tool from the wall 110.

The spacer 120 generally takes the form of a metal plate having the hole 122 centered within the spacer 120. The fastener 124 is typically a threaded bolt.

Figure 5:
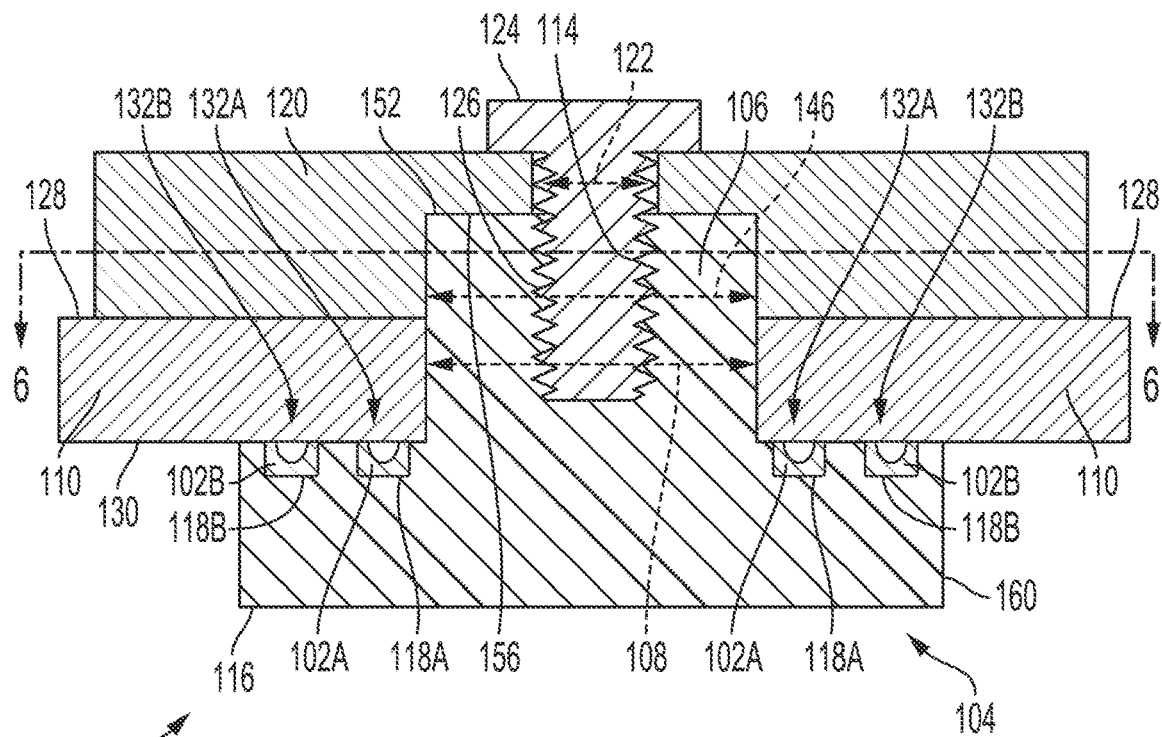
FIG. 5 is a cross sectional view of a wall and a friction weld plug, according to an example.

FIG. 5 is a cross sectional view of the wall 110 and the friction weld plug 100. The embodiment of the friction weld plug 100 shown in FIG. 5 includes a spacer 120 that is different from than the spacer 120 shown in FIG. 4. In FIG. 5, the spacer 120 includes a receptacle 146 that is configured to receive the nose 106 of the stud 104. Otherwise, any component shown in FIG. 5 generally can have the same properties or structures as described above with reference to FIG. 4 above.

As shown, the surface 152 of the nose contacts a surface 156 of the receptacle. The surface 156 faces axially and is configured to contact the surface 152 while the attachment exists between the male threads 126 and the female threads 114.

Figure 6:
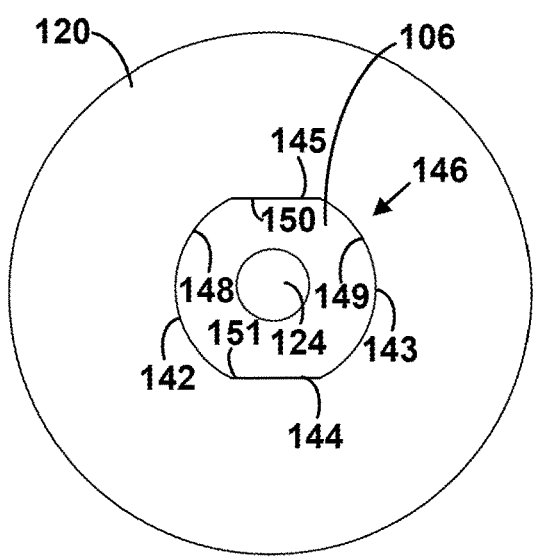
FIG. 6 is a cross sectional view of a friction weld plug, according to an example.

FIG. 6 is a cross sectional view of the friction weld plug 100 shown in FIG. 5. The spacer 120 includes the receptacle 146 that forms a surface 148, a surface 149, a surface 150, and a surface 151. The surface 148 and the surface 149 face radially inward and are round. The surface 150 and the surface 151 face radially inward and are substantially flat.

The nose 106 is configured to be inserted into the receptacle 146 such that the surface 145 contacts the surface 150 and the surface 144 contacts the surface 151, thereby causing the stud 104 to be rotationally fixed to the spacer 120.

Figure 7:
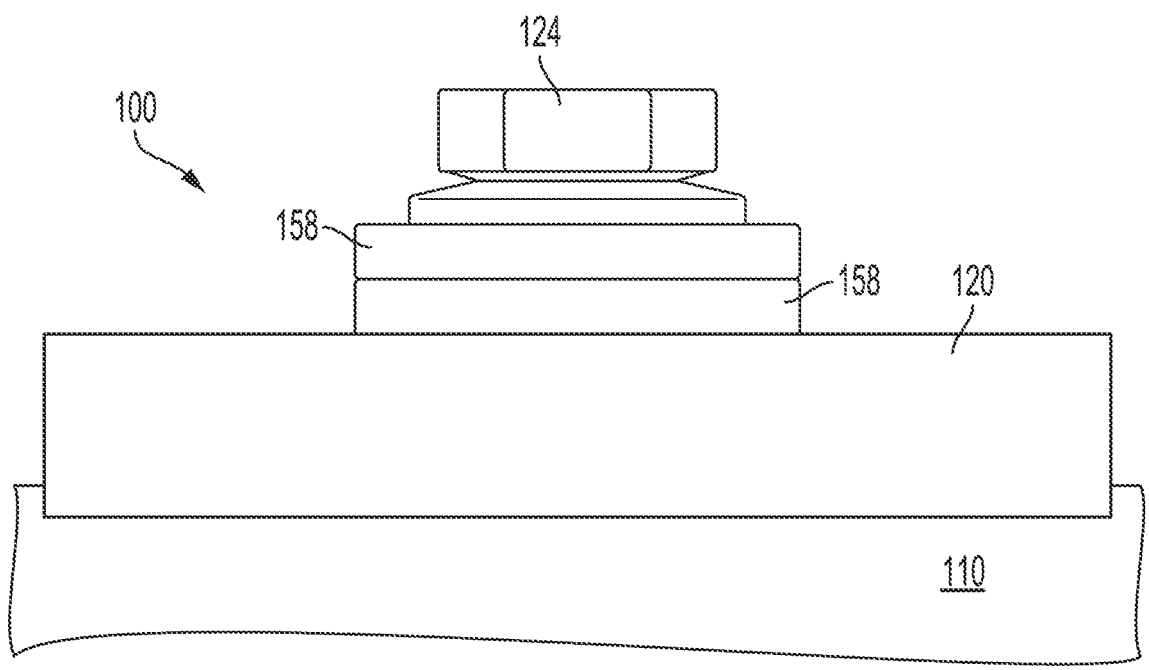
FIG. 7 is a front view of a wall and a friction weld plug, according to an example.

FIG. 7 is a front view of the wall 110 and the friction weld plug 100 from above the wall 110. As shown, the friction weld plug 100 can include one or more spring washers 158 between a head of the fastener 124 and the spacer 120. The fastener 124 is configured to be inserted through the one or more spring washers 158 and the hole 122, into the hole 108, and into the cavity 112 such that the male threads 126 and the female threads 114 form the attachment. In FIG. 7, the stud 104 is obscured by the wall 110.

Figure 8:
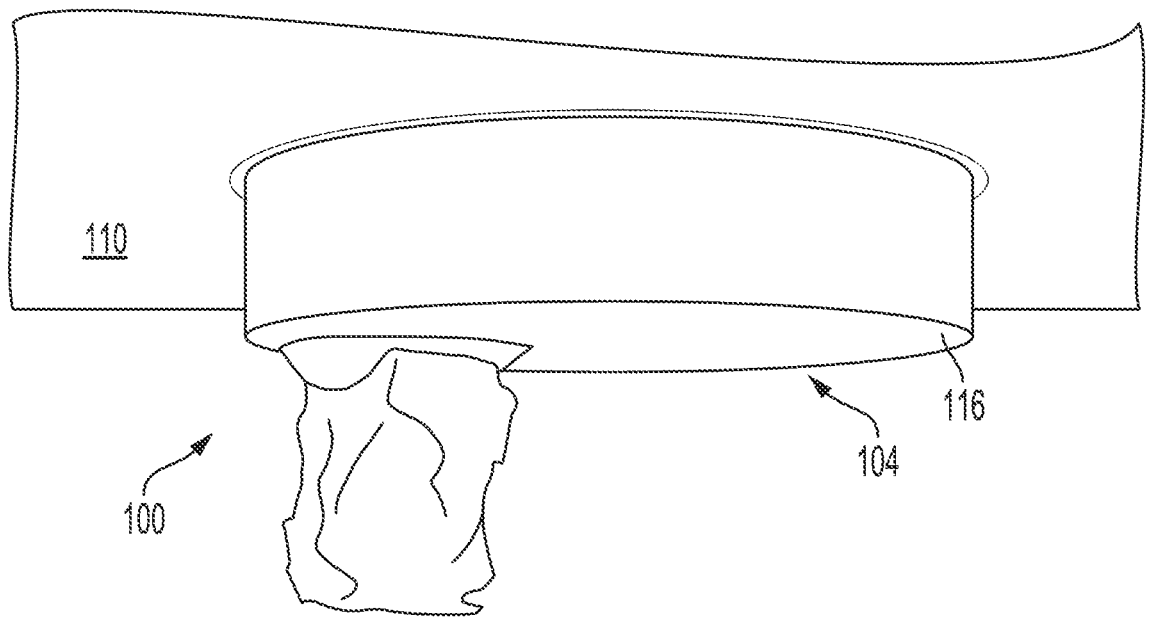
FIG. 8 is a front view of a wall and a friction weld plug, according to an example.

FIG. 8 is a front view of the wall 110 and the friction weld plug 100 from below the wall 110. In FIG. 8, the spacer 120 and the fastener 124 are obscured by the wall 110.

Figure 9:
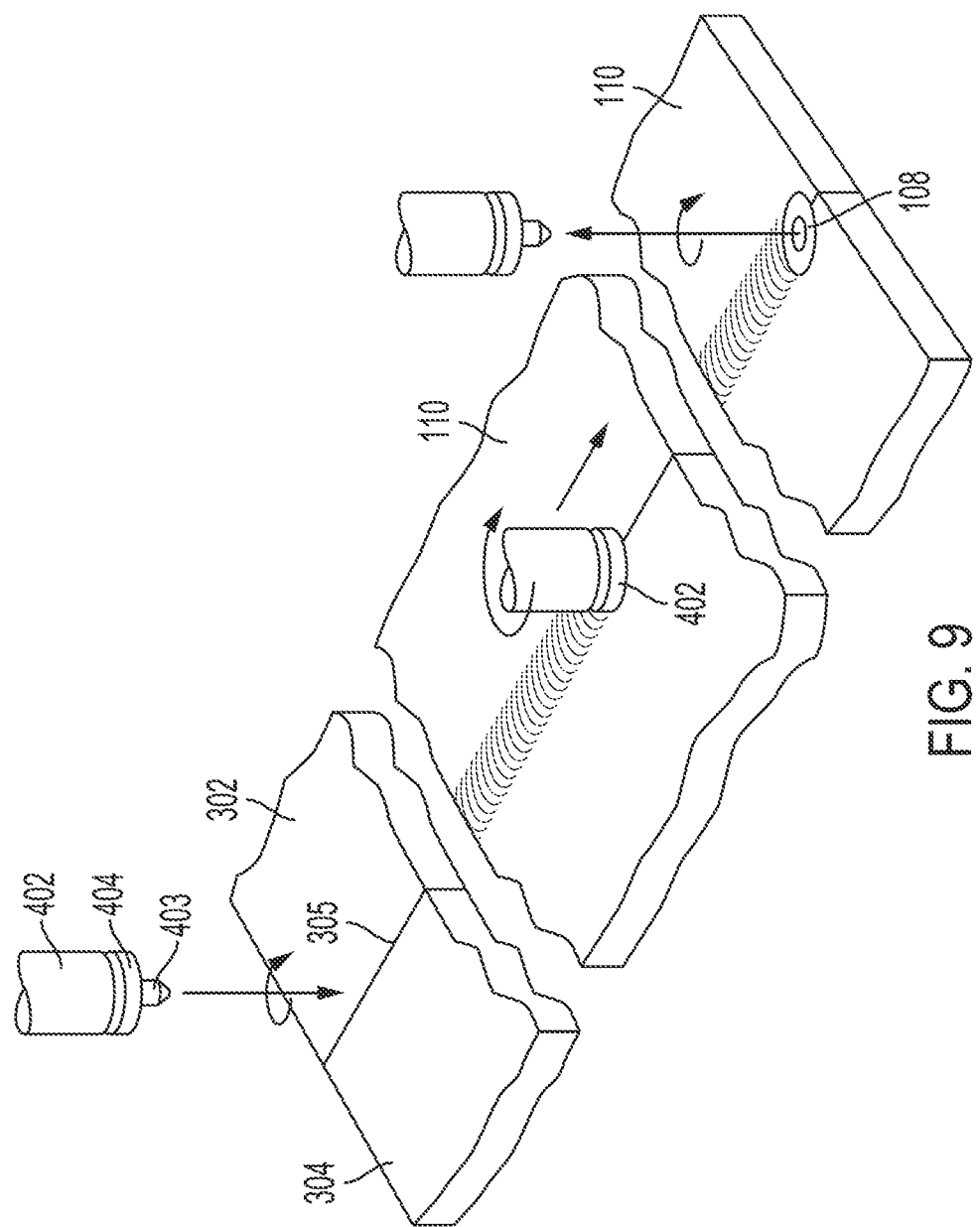
FIG. 9 is a perspective view of a friction stir welding process, according to an example.

FIG. 9 is a perspective view of a friction stir welding process. For example, a friction welding tool 402 is rotated at high speed and then lowered to make contact with a first panel 302 and a second panel 304 along a weld line 305. More specifically, a pin 403 of the friction welding tool 402 penetrates into the first panel 302 and the second panel 304 and spins, whereas a shoulder 404 of the friction welding tool 402 generally spins on the surface of the first panel 302 and the second panel 304 to create a bond at the weld line 305. The friction stir welding process causes the first panel 302 to bond with the second panel 304, thereby forming the wall 110 and producing the hole 108 in the wall 110 when the friction welding tool 402 is removed from the wall 110.

Referring to FIG. 4 or FIG. 5, the fastener 124 is inserted through the spacer 120 and into the hole 108 from the side 128 of the wall 110. Additionally, the nose 106 of the stud 104 is inserted into the hole 108 from the side 130 of the wall 110. Also, the attachment that presses the spacer 120 against the side 128 of the wall 110 and presses the gasket 102A and the gasket 102B against the side 130 of the wall 110 is created via rotating the male threads 126 of the fastener 124 against the female threads 114 of the cavity 112, thereby forming the seal 132A between the gasket 102A contained in the groove 118A and the side 130 of the wall 110 and forming the seal 132B between the gasket 102B contained in the groove 118B and the side 130 of the wall 110.

In some examples, the hole 108 is enlarged via drilling such that a diameter of the hole 108 matches (e.g., is substantially equal to) the diameter of the nose 106 of the stud 104.

FIG. 10 and FIG. 11 are block diagrams of a method 200 and a method 250 for installing the friction weld plug 100. As shown in FIG. 10 and FIG. 11, the method 200 and the method 250 include one or more operations, functions, or actions as illustrated by blocks 202, 204, 206, 208, and 210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes bonding, via a friction stir welding process, the first panel 302 to the second panel 304, thereby forming the wall 110 and producing the hole 108 in the wall 110. This functionality is described above with reference to FIG. 9.

At block 204, the method 200 includes inserting, from the side 128 of the wall 110, the fastener 124 of the friction weld plug 100 through the spacer 120 of the friction weld plug 100 and into the hole 108 in the wall 110. This functionality is described above with reference to FIG. 4 and FIG. 5.

At block 206, the method 200 includes inserting, from the side 130 of the wall 110 that is opposite the side 128, the nose 106 of the stud 104 of the friction weld plug 100 into the hole 108. This functionality is described above with reference to FIG. 4 and FIG. 5.

At block 208, the method 200 includes creating, via rotating the male threads 126 of the fastener 124 against the female threads 114 of the cavity 112 within the nose 106, the attachment that presses the spacer 120 against the side 128 of the wall 110 and presses the gasket 102A against the side 130 of the wall 110, thereby forming the seal 132A between the gasket 102A contained in the groove 118A in the shoulder 116 of the stud 104 and the side 130 of the wall 110. This functionality is described above with reference to FIG. 4 and FIG. 5.

At block 210, the method 250 includes enlarging the hole 108 in the wall via drilling. This functionality is described above with reference to FIG. 4 and FIG. 5.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A friction weld plug comprising:
    a gasket;
    a stud comprising:
        a nose configured to be inserted into a first hole formed within a wall, wherein the nose comprises a cavity having female threads; and
        a shoulder extending radially from the nose and comprising a groove configured to contain the gasket;
    a spacer comprising a second hole; and
    a fastener comprising male threads, wherein the fastener is configured to be inserted through the second hole, into the first hole, and into the cavity such that the male threads and the female threads form an attachment that presses the spacer against a first side of the wall and presses the gasket against a second side of the wall that is opposite the first side, thereby forming a seal between the gasket and the second side of the wall.

2. The friction weld plug of claim 1, wherein the groove is a first groove, the friction weld plug further comprising:
    a second gasket,
    wherein the shoulder further comprises a second groove configured to contain the second gasket,
    wherein the fastener is configured to be inserted through the second hole, into the first hole, and into the cavity such that the male threads and the female threads form the attachment that presses the second gasket against the second side of the wall, thereby forming a second seal between the second gasket and the second side of the wall.

3. The friction weld plug of claim 2, wherein the second groove surrounds the first groove.

4. The friction weld plug of claim 2, wherein the shoulder comprises:
    a first surface that includes the first groove and the second groove;
    a second surface opposite the first surface; and
    a port that provides fluid communication between the first surface and the second surface.

5. The friction weld plug of claim 4, wherein the port includes an outlet between the first groove and the second groove.

6. The friction weld plug of claim 1, wherein the gasket comprises a spring seal.

7. The friction weld plug of claim 1, wherein the gasket comprises a coating configured for friction reduction.

8. The friction weld plug of claim 1, wherein the nose comprises a surface that faces radially outward and is round.

9. The friction weld plug of claim 8, wherein the surface is a first surface and the nose comprises a second surface that faces radially outward and is substantially flat.

10. The friction weld plug of claim 9, wherein the spacer comprises a receptacle forming a third surface that faces radially inward and is round and forming a fourth surface that faces radially inward and is substantially flat.

11. The friction weld plug of claim 10, wherein the nose is configured to be inserted into the receptacle such that the first surface contacts the third surface and the second surface contacts the fourth surface, thereby causing the stud to be rotationally fixed to the spacer.

12. The friction weld plug of claim 10, wherein the nose forms a fifth surface that faces axially and that surrounds an opening to the cavity.

13. The friction weld plug of claim 12, wherein the receptacle forms a sixth surface that faces axially and is configured to contact the fifth surface while the attachment exists between the male threads and the female threads.

14. The friction weld plug of claim 1, further comprising a spring washer, wherein the fastener is configured to be inserted through the spring washer and the second hole, into the first hole, and into the cavity such that the male threads and the female threads form the attachment.

15. The friction weld plug of claim 1, wherein the nose extends in an axial direction away from the shoulder.

16. The friction weld plug of claim 1, wherein the shoulder comprises a surface that faces radially outward and is round.

17. A method for installing a friction weld plug, the method comprising:
- bonding, via a friction stir welding process, a first panel to a second panel, thereby forming a wall and producing a hole in the wall;
- inserting, from a first side of the wall, a fastener of the friction weld plug through a spacer of the friction weld plug and into the hole in the wall;
- inserting, from a second side of the wall that is opposite the first side, a nose of a stud of the friction weld plug into the hole; and
- creating, via rotating male threads of the fastener against female threads of a cavity within the nose, an attachment that presses the spacer against the first side of the wall and presses a gasket against the second side of the wall, thereby forming a seal between the gasket contained in a groove in a shoulder of the stud and the second side of the wall.

18. The method of claim 17, further comprising enlarging the hole in the wall via drilling.

19. The method of claim 18, wherein enlarging the hole in the wall via drilling comprises enlarging the hole such that the hole has a first diameter that is substantially equal to a second diameter of the nose.

20. A friction weld plug comprising:
- a first spring seal;
- a second spring seal;
- a stud comprising:
  - a nose configured to be inserted into a first hole formed within a wall, wherein the nose comprises a cavity having female threads; and
  - a shoulder extending radially from the nose and comprising a first groove configured to contain the first spring seal and a second groove configured to contain the second spring seal;
- a spacer comprising a second hole; and
- a fastener comprising male threads, wherein the fastener is configured to be inserted through the second hole, into the first hole, and into the cavity such that the male threads and the female threads form an attachment that presses the spacer against a first side of the wall and presses the first spring seal and the second spring seal against a second side of the wall that is opposite the first side, thereby forming a first seal between the first spring seal and the second side of the wall and a second seal between the second spring seal and the second side of the wall.

* * * * *